Patented June 24, 1930

1,766,350

UNITED STATES PATENT OFFICE

EDWIN M. PARTRIDGE, OF HAMMOND, INDIANA, AND ELWOOD W. SCARRITT, OF OAK PARK, ILLINOIS, ASSIGNORS, BY MESNE ASSIGNMENTS, TO THE PERMUTIT COMPANY, OF NEW YORK, N. Y., A CORPORATION OF DELAWARE

BASE-EXCHANGE MATERIAL AND PROCESS OF MAKING SAME

No Drawing. Application filed January 5, 1926. Serial No. 79,475.

This invention relates in general to the production of base-exchange materials and in particular to a new and improved process for preparing synthetically a double base exchange silicate of improved characteristics; said silicate containing a large proportion of silica and smaller proportions of alumina, sodium oxid and phosphorus oxid ($P_2O_5$) and having a high density and hardness.

Base exchange silicates made by the admixture of solutions of salts of aluminum with a solution of sodium silicate with subsequent drying and granulation of precipitates formed in the reaction, are known and are commonly classed as base exchange substances formed by the wet method. The precipitate formed is always a gel and may be a jelly. The ordinary commercial products of the so-called wet method of producing base exchange silicates by mixing solutions of aluminum salts and sodium silicate are in general characterized by their light weight and lack of hardness.

An object of the present invention is to produce a granular base exchange silicate of high density and weight per cubic foot. This is of direct advantage particularly when such silicate is used for purifying or softening water, in that material of high density and weight per cubic foot is not so easily lifted by water flowing upwards through it as a material of less density and weight per cubic foot. In practical use, base exchange material is subjected to the action of upwardly flowing water when the softener containing it is back-washed or when upward-flow softening is employed. Base-exchange material of low density and weight per cubic foot may be washed out of the softener at high rates of flow. Heavy material is of advantage in that either less free-board may be allowed for the material to rise into, or higher rates of flow may be employed with less danger of loss through washing out of the softener than when light material is employed.

Another object of the present invention is to produce a base exchange silicate with grains of exceptional hardness and durability.

Attempts have been made to accomplish an increase in the weight and hardness of base exchange silicates made by wet methods by adding salts other than sodium salts to the mixture. For instance, the use of iron salts and of salts of alkaline earths has been proposed.

We propose to attain the desired object by adding solutions of a salt of aluminum alone (that is, without the salt of any other metal) to a solution containing sodium silicate and the sodium salt of another element rather than to a solution of sodium silicate alone.

For our purpose we employ sodium phosphate and our improved method of procedure consists in the addition of a solution of aluminum sulfate to a mixed solution containing sodium silicate and sodium phosphate.

For instance, we may proceed as follows: We take 840 grams of 40 degree Bé. sodium silicate solution containing about 8.8 per cent of sodium oxide and 28.8 per cent of silica, and mix this with 160 grams of trisodium phosphate, both dissolved in sufficient water to make the solution up to a total volume of six liters. This solution we shall call solution "A." We then make up a second solution, B, by dissolving 312 grams of aluminum sulfate in sufficient water to make up a total volume of six liters. We then mix equal volumes of solutions A and B. Within a few minutes a gel is formed which we then dry at a low temperature, preferably not over 95 degrees C, that is, below the boiling point of water. The dried product is thrown into water which causes it to break up into small particles. It is then washed and we thus obtain a hard, heavy, durable base exchange composition of high exchange capacity in the form of small particles of great hardness. The weight of this product is 60 pounds or more per cubic foot.

This procedure could be modified by making the solutions of unequal concentration and mixing unequal volumes of the two solutions, or di-sodium phosphate could be substituted for tri-sodium phosphate, in which case, however, we should either employ a sodium silicate having a higher content of sodium oxide or we should add less aluminum sulfate.

The essential principle of our invention is the formation of a base-exchange silicate of more than ordinary density and weight per cubic foot and hardness, by the addition of a solution of an aluminum salt, and particularly aluminum sulfate, to a mixed solution of sodium silicate and the sodium salt of some acid-forming element other than silicon, particularly sodium phosphate.

We claim as our invention:

1. The process which consists in preparing a solution of aluminum sulfate, separately preparing a mixed solution of sodium silicate and sodium phosphate, combining the two solutions to form a gel and drying the latter at a temperature below the boiling point of water.

2. A base-exchange substance having a composition which, expressed in terms of oxides of its components, contains a large proportion of silica, and smaller proportions of alumina, sodium oxide and phosphorus oxide, said substance being distinguished by a density sufficiently high to make it weigh at least 60 pounds per cubic foot, and by the property of being in the form of small particles of great hardness.

3. In the manufacture of base exchange silicates the process which comprises gelling a solution containing alumina by one containing silica and a phosphate.

4. As a new base exchange silicate a hydrated gel silicate containing alkali, alumina and $P_2O_5$ and in the form of small hard particles.

5. In the manufacture of base exchange silicates in the wet way the process which comprises admixing a solution containing a silicate and a phosphate with a solution containing alumina.

In testimony whereof we have hereunto set our hands.

EDWIN M. PARTRIDGE.
ELWOOD W. SCARRITT.